US00RE45629E

(19) United States
(12) Reissued Patent
Yoshida et al.

(10) Patent Number: US RE45,629 E
(45) Date of Reissued Patent: Jul. 28, 2015

(54) IMAGE CAPTURING APPARATUS AND CONTROL METHOD THEREFOR

(71) Applicant: CANON KABUSHIKI KAISHA, Tokyo (JP)

(72) Inventors: Nobukazu Yoshida, Yokohama (JP); Akira Kubota, Yokohama (JP)

(73) Assignee: CANON KABUSHIKI KAISHA, Tokyo (JP)

(21) Appl. No.: 13/938,755

(22) Filed: Jul. 10, 2013

Related U.S. Patent Documents

Reissue of:
(64) Patent No.: 7,983,549
Issued: Jul. 19, 2011
Appl. No.: 12/182,771
Filed: Jul. 30, 2008

(30) Foreign Application Priority Data

Aug. 10, 2007 (JP) ..... 2007-210299

(51) Int. Cl.
*G03B 3/10* (2006.01)
*G03B 13/34* (2006.01)

(52) U.S. Cl.
CPC ..... *G03B 3/10* (2013.01)

(58) Field of Classification Search
USPC ..... 396/121, 123, 122
See application file for complete search history.

(56) References Cited

U.S. PATENT DOCUMENTS

| | | | | |
|---|---|---|---|---|
| 5,227,833 | A | 7/1993 | Ishida et al. | 396/92 |
| 5,264,889 | A | 11/1993 | Ishida et al. | 396/50 |
| 5,363,169 | A | 11/1994 | Ishida et al. | 396/123 |
| 7,417,683 | B2 * | 8/2008 | Hirai | 348/350 |
| 2003/0071908 | A1 * | 4/2003 | Sannoh et al. | 348/345 |
| 2003/0076437 | A1 * | 4/2003 | Karasaki et al. | 348/347 |
| 2006/0028577 | A1 * | 2/2006 | Honjo et al. | 348/345 |
| 2007/0019940 | A1 * | 1/2007 | Sasaki | 396/121 |
| 2007/0195171 | A1 * | 8/2007 | Xiao et al. | 348/207.99 |
| 2007/0296848 | A1 * | 12/2007 | Terashima | 348/345 |
| 2008/0068487 | A1 * | 3/2008 | Morita | 348/333.05 |

FOREIGN PATENT DOCUMENTS

| | | |
|---|---|---|
| JP | 04-009932 | 1/1992 |
| JP | 04-251234 A | 9/1992 |
| JP | 05-232371 | 9/1993 |

(Continued)

OTHER PUBLICATIONS

Jun. 28, 2013 Japanese Office Action, which is enclosed without English Translation, that issued in Japanese Patent Application No. 2012-179625.

*Primary Examiner* — Clayton E Laballe
*Assistant Examiner* — Warren K Fenwick
(74) *Attorney, Agent, or Firm* — Cowan, Liebowitz & Latman, P.C.

(57) ABSTRACT

Subjects are detected in a captured image and a main subject is selected from the detected subjects. Focusing areas are set up that correspond to the detected subjects and focus detection is performed in the focusing areas that have been set up. When providing in-focus indication representing focus detection results, focus detection results associated with the particular focusing area among the focusing areas that corresponds to the main subject are displayed in a manner different from focus detection results associated with those focusing areas within the depth of field that correspond to subjects other than the main subject.

16 Claims, 11 Drawing Sheets

(56) References Cited

FOREIGN PATENT DOCUMENTS

| | | | |
|---|---|---|---|
| JP | 2002-287011 | A | 10/2002 |
| JP | 2004-012503 | A | 1/2004 |
| JP | 2006-229367 | A | 8/2006 |

* cited by examiner

ALL AF FRAMES WITHIN THE DEPTH OF FIELD DISPLAYED

NO FRAME IS DISPLAYED

ALL FACE FRAMES WITHIN DEPTH OF FIELD DISPLAYED

IN-FOCUS INDICATION FOR MAIN FACE

OUT-OF-FOCUS INDICATION FOR MAIN FACE

IN-FOCUS INDICATION FOR AF FRAME (SINGLE FRAME)

OUT-OF-FOCUS INDICATION FOR AF FRAME (SINGLE FRAME)

IN-FOCUS INDICATION 2 FOR MAIN FACE

AUTOMATIC LIVE VIEW OF FACES

LIVE VIEW DISPLAY OF DESIGNATED FACE

IMAGE CAPTURING APPARATUS AND CONTROL METHOD THEREFOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an image capturing apparatus, as well as to a control method therefor, and, in particular, relates to a technology for displaying the results of subject focus detection.

2. Description of the Related Art

Conventionally, image capturing apparatuses, particularly image capturing apparatuses possessing an automatic focusing (auto-focus) feature, provide indication (in-focus indication) used for indicating in-focus subjects to the user.

Japanese Patent Laid-Open No. H04-9932 disclosed a technology for detecting whether subjects in multiple range-finding frames are respectively within the depth of field and for providing indication in locations corresponding to the range-finding frames of the subjects present within the depth of field.

Moreover, Japanese Patent Laid-Open No. H05-232371 disclosed an image capturing apparatus displaying range-finding frames considered to be within the depth of field in which a focus level threshold value is varied that is used to determine whether an item is within the depth of field depending on the focal length of the image capturing optical system.

Although the conventional technology does indeed make it easier to identify subjects within the depth of field, if more indication is provided to indicate subjects within the depth of field, the screen may become cluttered.

For instance, consider a situation, in which a user takes pictures using an image capturing apparatus permitting main subject selection and there are multiple subjects present at practically the same distance as a selected main subject. In such a case, identification of the main subject would be difficult and usability would suffer if indication were provided that all the subjects are within the depth of field.

SUMMARY OF THE INVENTION

The present invention provides, in one embodiment thereof, convenient indication of focus detection results in an image capturing apparatus capable of selecting a main subject.

According to an aspect of the present invention, there is provided an image capturing apparatus comprises: a detecting unit adapted to detect subjects in a captured image; a selecting unit adapted to select a main subject from among the subjects detected by the detecting unit; a setting unit adapted to set up focusing areas corresponding to the subjects detected by the detecting unit; a focusing control unit adapted to perform focus detection in the focusing areas set up by the setting unit; and a display control unit adapted to display indications representing the results of focus detection performed by the focusing control unit; wherein the display control unit displays the indications associated with a focusing area that corresponds to the main subject and a focusing area within the depth of field that corresponds to a subject other than the main subject in a different manner.

According to another aspect of the present invention, there is provided a control method for an image capturing apparatus comprises: detecting step of detecting subjects in a captured image; selecting step of selecting a main subject from among the subjects detected in the detection step; setting step of setting up focusing areas corresponding to the subjects detected in the detection step; focusing control step of performing focus detection in the focusing areas set up in the setting step; and display control step of displaying indications that represent the results of focus detection in the focusing control step; wherein the display control step displays the indications associated with a focusing area that corresponds to the main subject and a focusing area within the depth of field that corresponds to a subject other than the main subject in a different manner.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Configuration of Digital Camera 100

Figure 1:
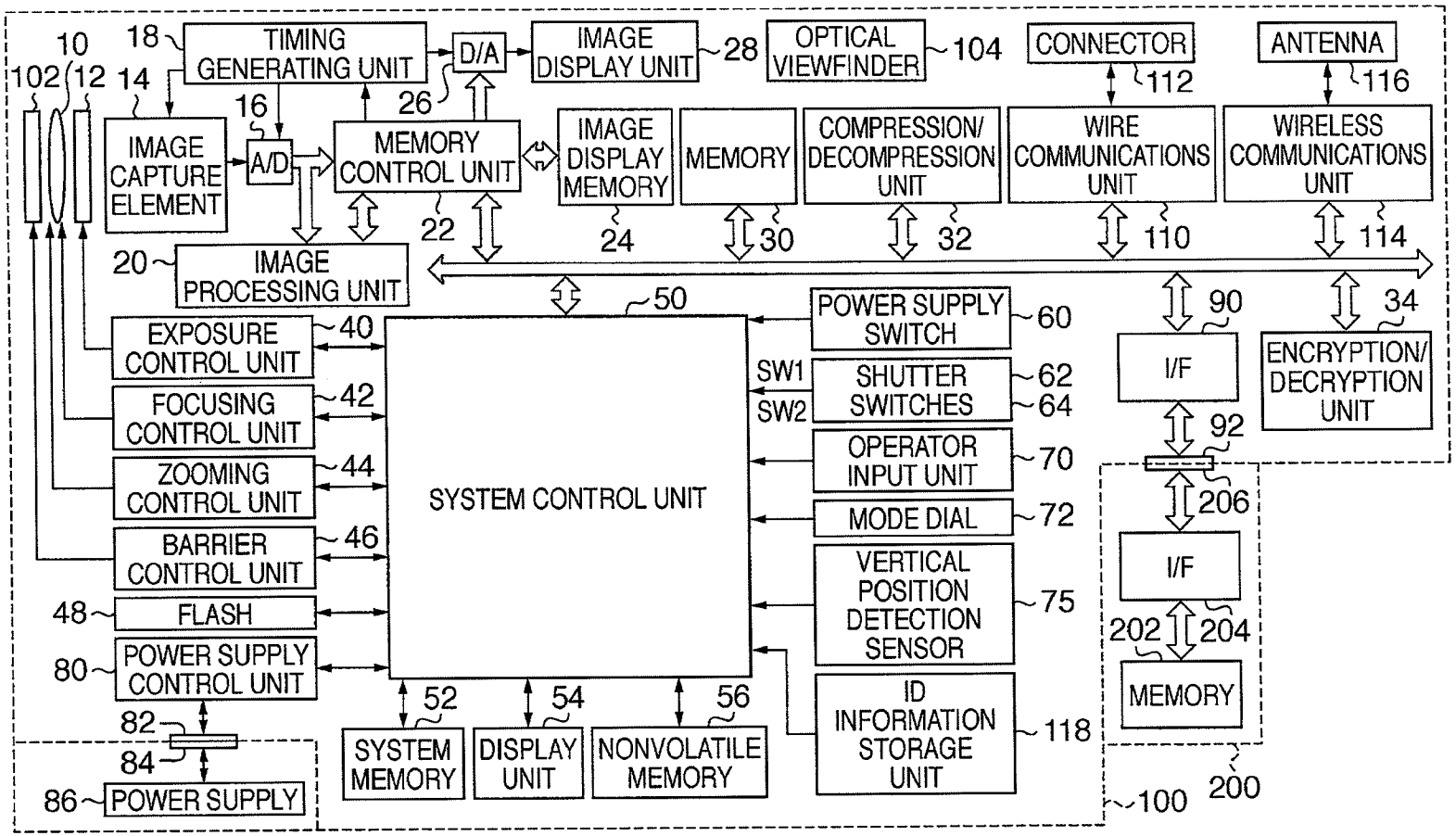
FIG. 1 is a block diagram illustrating an exemplary configuration of a digital camera 100, which is as an example of an image capturing apparatus used in a first embodiment of the present invention.

FIG. 1 is a block diagram illustrating an exemplary configuration of a digital camera 100, which is an example of an image capturing apparatus used in a first embodiment of the present invention. However, the image capturing apparatus used in the present embodiment is not limited to a digital camera and may be an apparatus that operates as a digital camera. Examples of apparatuses operating as digital cameras include, for instance, digital video cameras, mobile phones equipped with digital cameras, personal computers equipped with digital cameras, etc.

Here, 10 is a lens unit, 12 a shutter provided with a variable aperture feature, 14 an image capture element converting optical images into electrical signals, and 16 an A/D converter digitizing analog image signals obtained from the image capture element 14 and converting them into image data. It should be noted that a CCD image sensor or a CMOS image sensor, etc., can be used as the image capture element 14.

A timing generating unit 18, which supplies clock signals and control signals to the image capture element 14, to an A/D converter 16, and to a D/A converter 26, is controlled by a memory control unit 22 and a system control unit 50.

An image processing unit 20 performs a prescribed pixel interpolation process or color conversion process on image data obtained from the A/D converter 16 or image data obtained from the memory control unit 22.

Moreover, in the image processing unit 20, prescribed arithmetic operations are performed using the captured image data. Then, based on the obtained arithmetic operation results, the system control unit 50 controls an exposure control unit 40 and a focusing control unit 42 to implement features such as TTL (through-the-lens) type AF (auto-focusing), AE (automatic exposure), and EF (flash pre-emission).

Moreover, in the image processing unit 20, prescribed arithmetic operations are performed using the captured image data and a TTL-type AWB (automatic white balance) process is performed based on the obtained arithmetic operation results.

The memory control unit 22 controls the A/D converter 16, timing-generating unit 18, image processing unit 20, image display memory 24, D/A converter 26, memory 30, and compression/decompression unit 32.

The output data of the A/D converter 16 is written to the image display memory 24 or memory 30 via the image processing unit 20 and memory control unit 22, or alternatively, the output data of the A/D converter 16 is written to memory directly via the memory control unit 22.

The display image data written to the image display memory 24 is displayed via the D/A converter 26 on an image display unit 28, such as an LCD, an organic electroluminescent display, etc. Consecutive display of the captured image data on the image display unit 28 permits implementation of an electronic viewfinder (EVF) feature.

Moreover, the image display unit 28 can freely turn the display on and off based on instructions from the system control unit 50, and the power consumption of the digital camera 100 can be greatly reduced when the display is turned off.

The memory 30, which is a storage device storing captured still images and video images, is provided with sufficient storage space for storing a prescribed number of still images or video images of a prescribed duration. This allows for high-speed writing of large quantities of images to the memory 30 even during panoramic imaging and burst imaging involving continuous capture of multiple still images.

Moreover, the memory 30 can also be used as a workspace for the system control unit 50.

The compression/decompression unit 32 reads the image data stored in the memory 30, compresses the image data in accordance with a prescribed image compression method and writes the compressed image data to the memory 30. Moreover, the compression/decompression unit 32 can also read the compressed image data from the memory 30, decompress the image data, and write the decompressed image data to the memory 30. It should be noted that the image compression methods specified in the JPEG, JPEG 2000, etc. or image compression methods utilizing adaptive discrete cosine transforms (ADCT), wavelet transforms, etc. can be used as the prescribed image compression method.

If necessary, the encryption/decryption unit 34 carries out an encryption process on the image data obtained by imaging and stored in a predetermined area of the memory 30. The encryption/decryption unit 34 carries out a decryption process when playing back/displaying the encrypted image data stored in the predetermined area of the memory 30.

Along with controlling the shutter 12 provided with a variable aperture feature, the exposure control unit 40 also has a flash light output adjustment feature, which is implemented in co-operation with the flash 48.

The focusing control unit 42 controls the focusing of the lens unit 10. A zooming control unit 44 controls the zooming of the lens unit 10. A barrier control unit 46 controls the operation of a barrier 102, which is used to protect the lens unit 10.

The flash 48 serves as a supplemental light source during photography and also has a light output adjustment feature. Moreover, it also has a feature for projecting supplemental AF light.

The exposure control unit 40 and focusing control unit 42 are controlled using the TTL method, with the system control unit 50 exercising control over the exposure control unit 40 and focusing control unit 42 based on the results of the arithmetic operations performed by the image processing unit 20 on the captured image data.

The system control unit 50 is, for instance, a CPU, which controls the entire digital camera 100 by executing software stored in a system memory 52. The system memory 52 stores constants, variables, software, etc. used in the operation of the system control unit 50.

The display unit 54, which is made up of a combination of output devices such as, for instance, LCDs, LEDs, speakers, etc., outputs the operational status and messages, etc., using characters, images, sounds, and the like in response to program execution in the system control unit 50. A single or multiple display units 54 are provided in a readily viewable location or locations in the vicinity of an operator input unit 70 in the digital camera 100. Moreover, some of the display units 54 are located within the optical viewfinder 104.

The contents of the display provided by the display units 54 include, for instance, the insertion/removal status of the memory card 200, the operational status of the communications interface, the status of connections to external computers, etc. The contents are partly displayed in the optical viewfinder 104.

Also, some contents in the display of the display unit 54 are displayed using lamps including, for instance, self-timer notification lamps, etc. Self-timer notification lamps may be used in combination with the supplemental AF light.

The nonvolatile memory 56, which is an electrically erasable/recordable memory, may utilize an EEPROM, etc. The nonvolatile memory 56 stores the various settings and default values used by the digital camera 100.

The mode dial 72, first shutter switch (SW1) 62, second shutter switch (SW2) 64, power supply switch 60, and operator input unit 70 are operator input members used for issuing instructions concerning starting and stopping prescribed operations to the system control unit 50. These operator input members are made up of buttons, switches, dials, touch panels, line-of-sight detection devices, speech recognition devices, or combinations thereof.

Here, specific explanations will be provided regarding the operator input members.

The mode dial 72 is a switch used for switching to and configuring various functional modes, such as, for instance, the still image recording mode (automatic imaging mode, programmed imaging mode, and panoramic imaging mode), video recording mode, playback mode, multi-screen playback/erasure mode, PC connection mode, etc.

The first shutter switch (SW1) 62 is turned on by a first stroke (for instance, a semi-depression) applied to a shutter button (not shown) provided in the digital camera 100. When the first shutter switch (SW1) 62 is turned on, an AF (autofocusing) process, an AE (automatic exposure) process, an AWB (automatic white balance) process, and an EF process are initiated.

The second shutter switch (SW2) 64 is turned on by a second stroke (for instance, a full depression) applied to the shutter button provided in the digital camera 100, which provides an instruction to initiate a series of processing steps comprising an exposure process, a development process, and a recording process. First of all, during the exposure process, a signal read from the image capture element 14 is written as image data to the memory 30 via the A/D converter 16 and memory control unit 22. In addition, a development process is performed using the arithmetic operations carried out by the image processing unit 20 and memory control unit 22. In addition, the image data is read from the memory 30, compression is performed in the compression/decompression unit 32 and a recording process is effected, during which the image data is written to the memory card 200.

The power supply switch 60 is a switch used for turning the power supply of the digital camera 100 on and off.

The operator input unit 70 is a user interface equipped with switches, buttons, rotary dial switches, touch panels, and other operator input members. A main face select button, as well as a main face deselect button, which will be described below, are included in the operator input unit 70. The image recording modes, compression ratio, and image quality etc. of the captured images can be selected with the help of the operator input unit 70. The image recording modes include a JPEG mode and a RAW mode. The JPEG mode is an image recording mode, in which a captured image is compressed using the JPEG compression scheme and saved on the memory card 200, etc. The RAW mode is an image recording mode, in which digital data obtained by digitizing a signal obtained from the image capture element 14 is saved on the memory card 200, etc., without compression or after compression based on a lossless compression scheme. It should be noted that in the JPEG mode the compression ratio and image quality can be selected with the help of the operator input unit 70.

The vertical position detection sensor 75 is a sensor that detects whether the orientation of the digital camera 100 is vertical or horizontal.

A power supply control unit 80, which is made up of a battery detection circuit, a DC-DC converter, and a switching circuit used for switching the blocks to be energized, detects the presence/absence of an installed battery, the type of the battery, as well as its remaining battery capacity. Moreover, based on the detection results and instructions from the system control unit 50, the power supply control unit 80 controls the DC-DC converter and supplies the necessary voltage to the memory card 200 and other components for a requisite period of time.

The power supply 86, which is made up of an alkali battery, a lithium battery or another primary battery, a NiCd battery, a NiMH battery, a Li battery, or another secondary battery, or an AC adaptor, is connected to the digital camera 100 using connectors 82 and 84.

The memory card 200 is a removable storage medium. An SD memory card, a CompactFlash™ card, a removable hard disk drive (HDD), etc., can be used as the memory card 200. The memory card 200 has a memory 202, a camera interface 204, and a connector 206. The memory 202 is a randomly accessible nonvolatile memory. The camera interface 204 is capable of communicating with the card interface 90 of the digital camera 100. The connector 206 can be connected to the connector 92 of the camera. It should be noted that insertion and removal of the memory card 200 is detected by a card detection unit (not shown) incorporated into the digital camera 100.

The barrier 102 covers the image capture unit of the digital camera 100, which includes the lens unit 10, in order to prevent the image capture unit from being contaminated or damaged.

The optical viewfinder 104 is, for instance, a TTL viewfinder, which uses prisms or mirrors to form images from a luminous flux passing through the lens unit 10. The optical viewfinder 104 enables imaging without using the electronic viewfinder function of the image display unit 28. Moreover, as described above, some of the features of the display unit 54, such as in-focus indication, hand tremor warning messages, flash charge indication, shutter speed indication, aperture value indication, exposure compensation indication, etc., are implemented in the optical viewfinder 104.

A wire communications unit 110 effects communications using RS232C, USB, IEEE1394, P1284, SCSI, modems, LANs, etc. The connector 112 is a connector for connecting a cable during communications between the digital camera 100 and external devices via the wire communications unit 110.

A wireless communications unit 114 effects communications based on IEEE802.11a/b/g and other wireless LAN communications, Bluetooth, IrDA, etc. An antenna 116 is used during communications between the digital camera 100 and external devices via the wireless communications unit 114.

When wireless communications with external devices (not shown) are conducted through the wireless communications unit 114 and antenna 116, the ID information storage unit 118 stores identification information of various types used for authentication prior to the communications. The ID information storage unit 118 is, for instance, a rewritable nonvolatile memory.

(General Operation)

Figure 2:
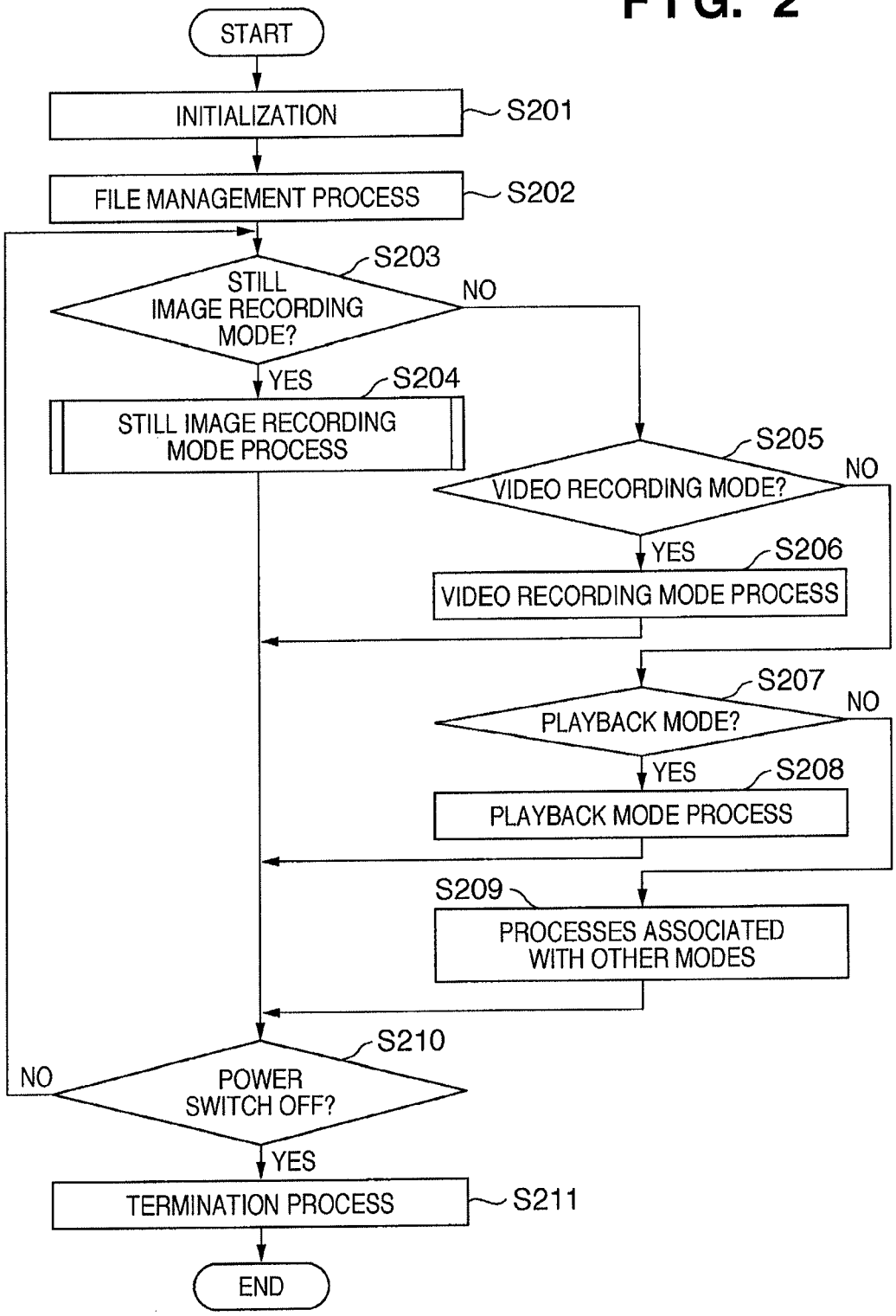
FIG. 2 is a flow chart explaining the general operation of the digital camera 100 according to the first embodiment of the present invention.

FIG. 2 is a flow chart explaining the general operation of the digital camera 100 according to a first embodiment of the present invention.

When the power supply is switched on by operating the power supply switch 60, in S201, the system control unit 50 initializes flags, control variables, etc. A main face selection flag is released during initialization. Subsequently, in S202, the system control unit 50 initiates a management process on files saved on the memory card 200.

Next, in S203, S205, and S207, the system control unit 50 determines the position, in which the mode dial 72 is set. If it is set to the still image recording mode, the process advances from S203 to S204, and a still image recording mode process is executed. The still image recording mode process of S204 is described in detail below with reference to FIG. 3. If the mode dial 72 is set to the video recording mode, the process advances to S206 via S203 and S205, and a video recording mode process is executed. Furthermore, if the mode dial 72 is set to the playback mode, the process advances to S208 via S203, S205, and S207 to execute a playback mode process.

Moreover, when it is set to other modes, the process advances to S209, and the system control unit 50 carries out the process associated with the selected mode. The other modes include, for instance, a transmission mode process, during which files stored on the memory card 200 are transmitted, and a reception mode process, during which files are received from external devices and stored on the memory card 200.

After executing the process corresponding to the mode set up using the mode dial 72 in S204, S206, S208, and S209, the process advances to S210. In S210, the system control unit 50 determines the position, in which the power switch 60 is set. If the power switch 60 is set to the "power-on" position, the process directed back to S203. On the other hand, if the power switch 60 is set to the "power-off" position, the process advances from S210 to S211 and the system control unit 50 carries out a termination process.

Examples of processing included in the termination process are as follows. Namely, this may involve changing the display on the image display unit 28 to an end-state, closing the barrier 102 to protect the lens unit 10, saving the configured modes, setup values, and parameters, including control variables and flags, etc., in the nonvolatile memory 56, and cutting off power to units that do not require power supply. When the termination process of S211 is over, the system control unit 50 controls the power supply control unit 80 so as to cause the power supply to switch to an "off" state.

(Still Image Recording Mode)

Figure 3:
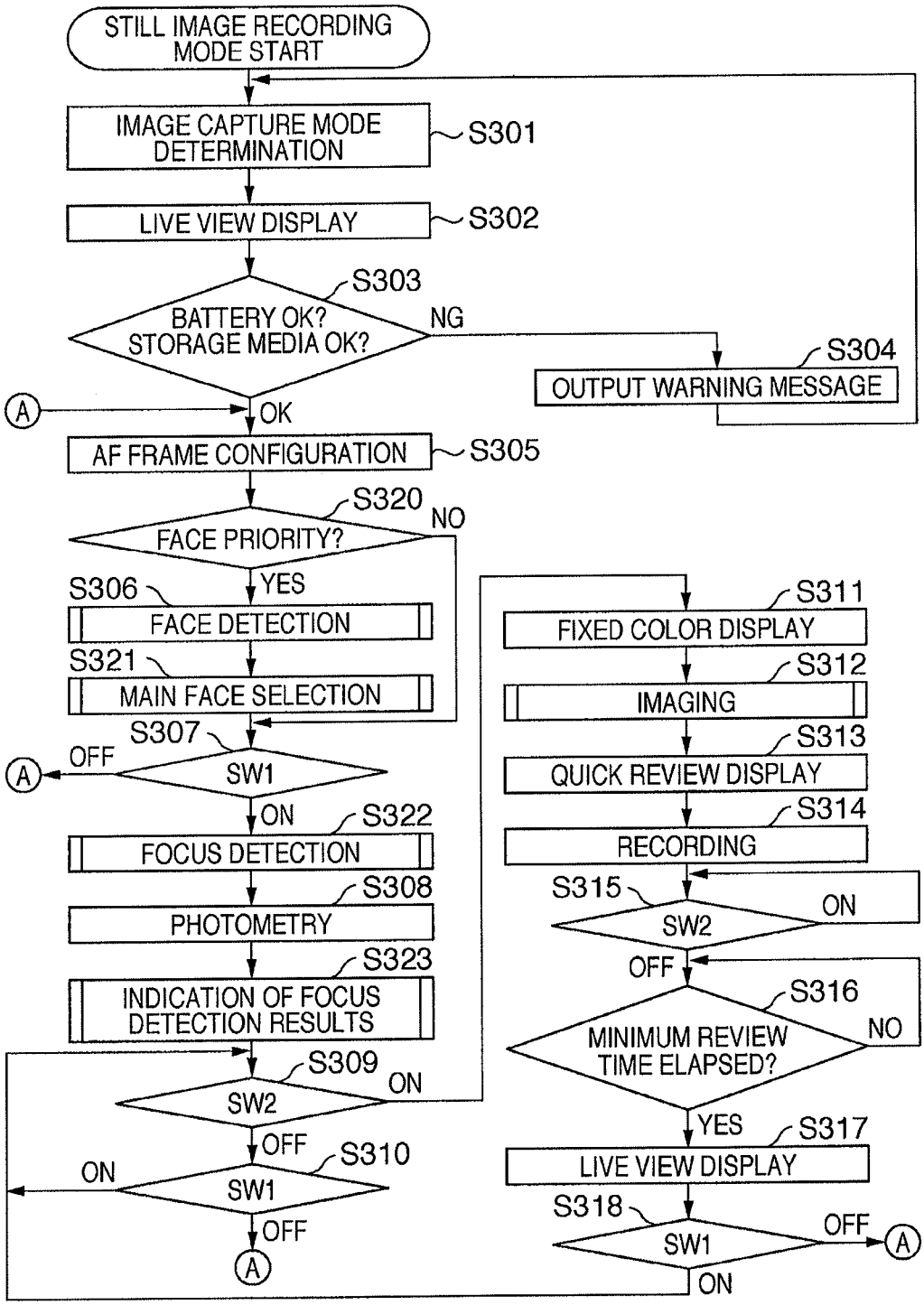
FIG. 3 is a flow chart illustrating an example of a still image recording mode process performed by the digital camera 100 according to the first embodiment of the present invention.

FIG. 3 is a flow chart illustrating an example of the still image recording mode process performed in S204 of FIG. 2.

It should be noted that the still image recording mode process illustrated in FIG. 3 is assumed to cease when the mode is switched to a different mode using the mode dial 72 or when the power switch 60 is set to "off".

If the still image recording mode is initiated, the system control unit 50 determines the image capture mode in S301. The determination of the image capture mode is performed by (1) acquiring the image capture mode that existed at the time when the previous still image recording mode ended from the nonvolatile memory 56 and storing it in the system memory 52, or (2) storing a configured and entered image capture mode in the system memory 52 when the user configures and enters an image capture mode by manipulating the user input unit 70.

As used herein, the term "image capture mode" refers to modes implemented as combinations of shutter speeds, aperture values, strobe firing status, and sensitivity settings suitable for particular imaging scenes, etc. The digital camera 100 of the present embodiment is assumed to have, for instance, the following image capture modes.

Auto-mode: A mode, in which various parameters of the camera are determined automatically by the software built into the digital camera 100 based on measured exposure values.

Manual Mode: A mode, in which the user can freely change the various parameters of the camera.

"Scene Mode": A combination of a shutter speed, an aperture value, a strobe firing status, a sensitivity setting, etc., suitable for a particular imaging scene is configured automatically.

Furthermore, the following modes are assumed to be included in the scene mode.

Portrait Mode: A mode specifically adapted to taking pictures of people, in which images of people are emphasized by blurring the background.

Night Scene Mode: A mode specifically adapted to night scenery, in which the light of the strobe is directed at a person and the background is recorded using a slow shutter speed.

Landscape Mode: A mode specifically adapted to wide-open landscape scenery.

Night & Snap Mode: A mode suitable for taking beautiful pictures of people and night scenery without a tripod.

Kids & Pets Mode: A mode, in which pictures of restless children and pets can be taken without missing good picture-taking opportunities.

Spring & Fall Foliage Mode: A mode adapted to taking pictures of leaves and trees with fresh green and other foliage in vibrant colors.

Party Mode: A mode, in which pictures of subjects are taken in authentic colors under fluorescent and incandescent light sources while suppressing hand tremors.

Snow Mode: A mode, in which pictures of people are taken against a snow-covered background without darkening or bluish tints.

Beach Mode: A mode, in which pictures of people etc. can be taken without darkening on a sand beach or sea surface under intense sunlight reflection conditions.

Fireworks mode: A mode used for taking brilliant pictures of aerial fireworks using the most appropriate exposures.

Aquarium mode: A mode, in which the most suitable sensitivity, white balance, and colors are used for taking pictures of fish, etc., in indoor aquarium tanks.

Underwater Mode: A mode, in which the most appropriate white balance is configured for underwater photography and pictures are taken in blue tint-free colors.

In S302, upon determination of the image capture mode in S301, the system control unit 50 starts a live view display, during which image data from the image capture element 14 is successively displayed on the image display unit 28. As a result, the image display unit 28 operates as an EVF.

Subsequently, in Step S303, the system control unit 50 uses the power supply control unit 80 to determine whether the residual capacity provided by the batteries, etc., as well as the presence/absence and residual capacity of the memory card 200, will present problems for the operation of the digital camera 100. If there is going to be a problem, in S304, the system control unit 50 uses the image display unit 28 to output a prescribed warning message using images and sounds and then directs the process back to step S301.

If there won't be any problems associated with the status of the memory card 200, in S305, the system control unit 50 configures AF (auto-focus) frames (focusing areas) as needed. In the present embodiment, the AF frames can be configured by the user in an arbitrary fashion by manipulating the operator input members used for configuring AF frame settings included in the operator input unit 70 and a menu screen (not shown) displayed on the image display unit 28 by pushing menu buttons included in the operator input unit 70.

The AF frame setting options of the digital camera 100 of the present embodiment are assumed to include: "Center", whereby a single frame in the center is used as the AF area; "Active", whereby the user can move an AF area to any arbitrary position using the operator input members included in the operator input unit 70; "AiAF", whereby nine AF area frames are configured and a focusing operation is performed therein; and "Face Priority", whereby AF areas is set up depending on the detected face position.

The system control unit 50 determines whether the AF frame setting is "Face Priority" (S320) and advances to S307 if it is not "Face Priority". If the AF frame setting is "Face Priority", it advances to S306.

In S306, the system control unit 50 performs a face detection process to detect presence of subjects, for instance, human faces (facial areas) in an image displayed on the live view display. The face detection process, which is an example of a subject detection process, will be described in detail below with reference to FIG. 4. When facial areas are detected during the face detection process, the system control unit 50 stores the coordinates of the locations and sizes (width, height) of the detected facial areas, the number of the detected areas, the coefficients of reliability, etc., in the system memory 52 as "face information". If no facial areas are detected during the face detection process, the face information in the system memory 52 is set to "0". The process advances to S321 when the face detection process (S306) ends.

In S321, the system control unit 50 checks the face information, which is an example of the subject information stored in the system memory 52, and selects a main facial area, which is an example of the main subject, from among the detected facial areas. The main face selection process (S321) will be described below with reference to FIG. 6.

The main face selection of S321 may rely on user input. In the present embodiment, when a main face is specified based on user input, the system control unit 50 sets a main face selection flag.

An example of the live view display provided on the image display unit 28 is illustrated in FIG. 10.

Figure 10A:
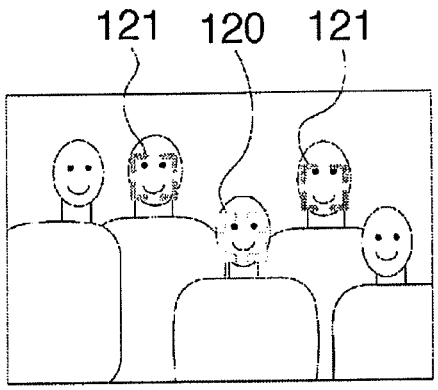
FIG. 10A and FIG. 10B are diagrams illustrating an example of live view displays provided by the digital camera 100 according to the first embodiment of the present invention.
Figure 10B:
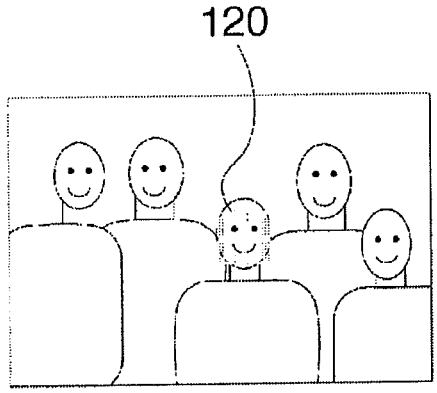

FIG. 10A shows an example of the display provided if no main face selection flag has been set, that is, if the image capturing apparatus has determined the main face automatically, and FIG. 10B shows an example of the display provided when a main face selection flag has been set.

In FIG. 10A, a white face frame 120, which indicates the facial area of the main subject, is displayed along with gray face frames 121 in the facial areas of the other subjects (subjects other than the main subject). It should be noted that, in the present embodiment, the number of face frames displayed in the live view display is limited to 3 due to display processing load and display rate-related considerations. On the other hand, only the user-selected main subject has a white face frame 120 displayed in FIG. 10B.

Subsequently, in S307, the system control unit 50 determines whether or not the first shutter switch SW1 62 is on. If the first shutter switch SW1 62 is off, the process goes back to S305, and the process of S305 and S306 is repeated.

On the other hand, if the first shutter switch SW1 62 is on, in S322, the system control unit 50 controls the focusing control unit 42 to perform a focus detection process, focuses the lens unit 10 onto the subject, and advances to S308. The focus detection process will be described below with reference to FIG. 7.

In S308, the system control unit 50 determines an aperture value and shutter time (shutter speed) by performing a photometric process. It should be noted that, if necessary, the flash is also configured during the photometric process. At such time, if faces (facial areas) have been detected in S306, photometry may be performed in the detected faces.

Next, in S323, the system control unit 50 uses the image display unit 28 to provide indication representing the results of focus detection in S322. The display process will be described in detail below with reference to FIG. 8.

Next, the on/off status of the first shutter switch SW1 62 and second shutter switch SW2 64 is determined in S309, S310. The process advances from S309 to S311 when the second shutter switch SW2 64 is on while the first shutter switch SW1 62 is on. When the first shutter switch SW1 62 is off (when the first shutter switch SW1 62 is released while the second shutter switch SW2 64 not on), the process goes from S310 back to S305. Moreover, while the first shutter switch SW1 62 is on and the second shutter switch SW2 64 is off, the process of S309 and S310 is repeated.

When the second shutter switch SW2 64 is turned on, in S311, the system control unit 50 switches the display state of the image display unit 28 from the live view display to a fixed color display state. Then, in S312, the system control unit 50 controls each unit to execute an imaging process, which includes an exposure process and a development process. It should be noted that, during the exposure process, image data obtained through the A/D converter 16 or data from the A/D converter 16 is written directly to the memory 30. Moreover, during the development process, the system control unit 50 controls the image processing unit 20, and, if necessary, reads out the image data written to the memory 30 and performs various types of processing. Below, the imaging process will be described in detail with reference to FIG. 5.

Next, in Step S313, the system control unit 50 carries out a quick review of the image data obtained during the imaging process on the image display unit 28. The term "quick review process" refers to processing performed to display image data on the image display unit 28 for a predetermined time (review time) prior to saving it on the memory card 200 after photographing subjects for the purpose of validating the captured images.

After the quick review display, in S314, the system control unit 50 executes a recording process, whereby the image data obtained in the imaging process is written to the memory card 200 as image files.

When the recording process of S314 ends, in S315, the system control unit 50 determines the on/off status of the second shutter switch SW2 64. If the second shutter switch SW2 64 is on, the determination of S315 is repeated while waiting for the second shutter switch SW2 64 to be turned off. The quick review display continues while the second shutter switch SW2 64 is on. In other words, the quick review display on the image display unit 28 is continued until the second shutter switch SW2 64 is turned off when the recording process of S414 terminates. Using such a configuration allows the user to carefully check the captured image data presented on the quick review display by keeping the shutter button fully depressed.

The second shutter switch SW2 64 is turned off and the process advances from S315 to S316 when the fully depressed state is released by removing the hand etc. from the shutter button after the user takes a picture by fully depressing the shutter button. In S316, the system control unit 50 determines whether the predetermined minimum display time (minimum review time) of the quick review display has elapsed. If the minimum review time has elapsed, the system control unit 50 advances the process to S317, and if it has not elapsed, waits for the minimum review time to elapse.

In S317, the system control unit 50 switches the display state of the image display unit 28 from the quick review display back to the live view display. As a result of this process, after checking the captured image data using the quick review display, the display state of the image display unit 28 automatically switches back to the live view display, which successively displays image data from the image capture element 14 for subsequent image capture.

Then, in S318, the system control unit 50 determines the ON/OFF status of the first shutter switch SW1 62 and directs the process back to S309 if the first shutter switch SW1 62 is on, or back to S305 if it is off. That is to say, the system control unit 50 prepares for the capture of the next image if the semi-depressed state of the shutter button continues (the first shutter switch SW1 62 is on) (S309). On the other hand, the system control unit 50 ends the series of imaging operations and returns to the image capture standby state if the shutter button is released (the first shutter switch SW1 62 is off) (S305).

(Face Detection Process)

Figure 4:
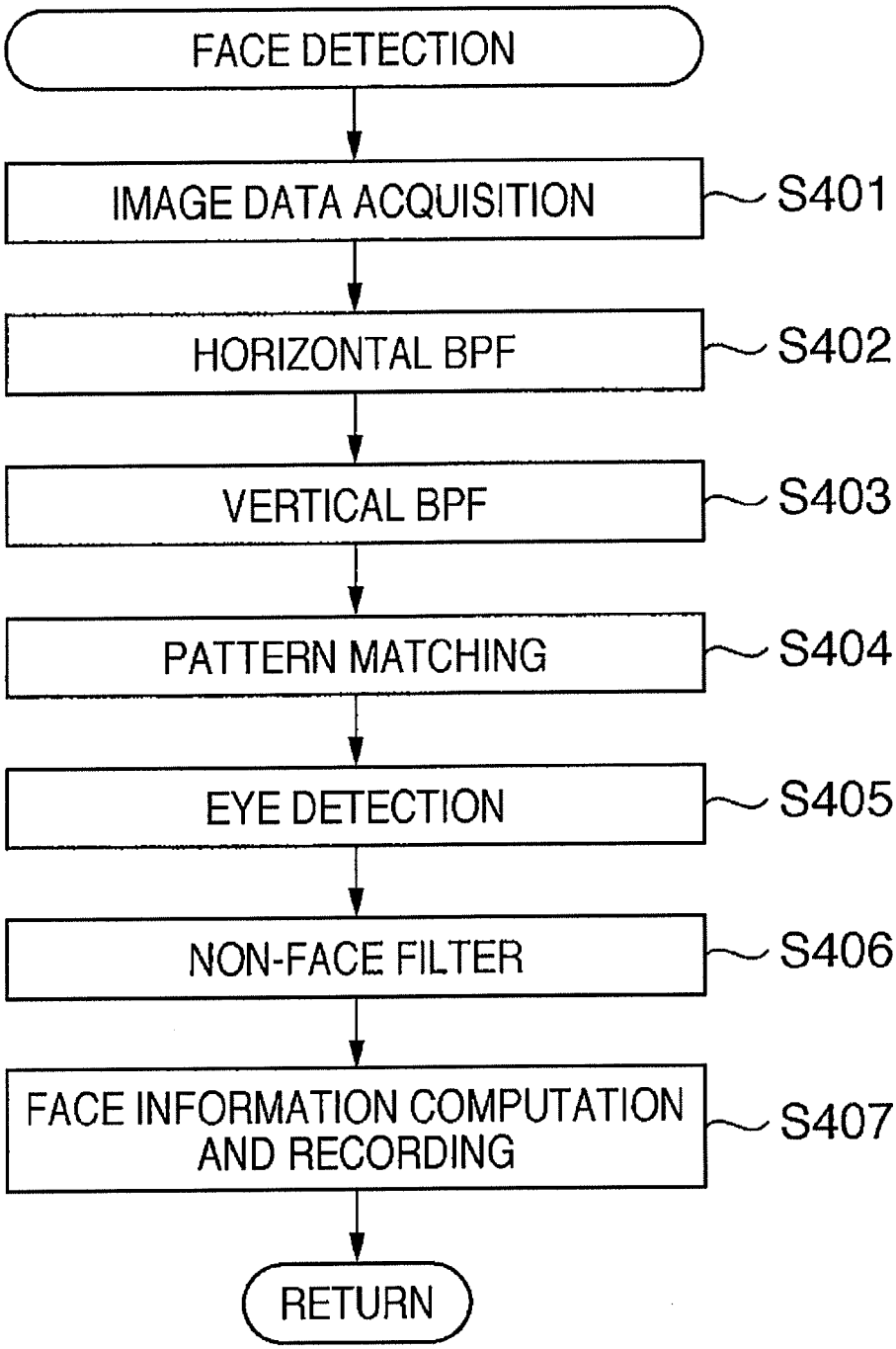
FIG. 4 is a flow chart illustrating an example of the still image recording mode process performed by the digital camera 100 according to the first embodiment of the present invention.

Next, an example of the face detection process performed in S306 of FIG. 3 will be explained with reference to the flow chart illustrated in FIG. 4. As explained above, the face detection process is an example of a subject detection process, and subject detection may be performed by other methods.

In S401, the system control unit 50 sends image data associated with face detection targets from the memory 30 to the image processing unit 20. In S402, the image processing unit 20 applies a horizontal band-pass filter to the image data under the control of the system control unit 50. Moreover, in S403, under the control of the system control unit 50, the image processing unit 20 applies a vertical band-pass filter to the image data processed in S402. The horizontal and vertical band-pass filtering detects edge components in the image data.

Subsequently, in S404, the system control unit 50 performs pattern matching on the detected edge components and extracts groups of eye, nose, mouth, and ear candidates. Then, in S405, the system control unit 50 performs an eye detection process, whereby a couple of candidates satisfying preset conditions (for instance, the distance between, or the orientation, etc. of two eyes) from the eye candidate group extracted in S404 are determined to be an eye pair. The system control unit 50 then removes candidates that do not form eye pairs and narrows down the eye candidate group.

Then, in S406, the system control unit 50 associates the eye candidate group that was narrowed down in S405 with other face-forming parts (nose, mouth, ears) corresponding thereto and applies a preset non-face condition filter, thereby detecting faces (facial areas). In S407, the system control unit 50 computes face information (the coordinates of the location and size (width, height) of the facial areas, the number of the detected areas, the coefficients of reliability, etc.) for the facial areas detected in S406, stores it in the system memory 52, and terminates the process.

Using the image data displayed on the live view display as described above permits extraction of characteristic quantities from the image data and detection of subject information. In the present embodiment, face information was used as an example of the subject information. However, the subject information that can be acquired from images displayed on the live view display additionally includes red-eye information and various other types of information.

(Imaging Process)

Figure 5:
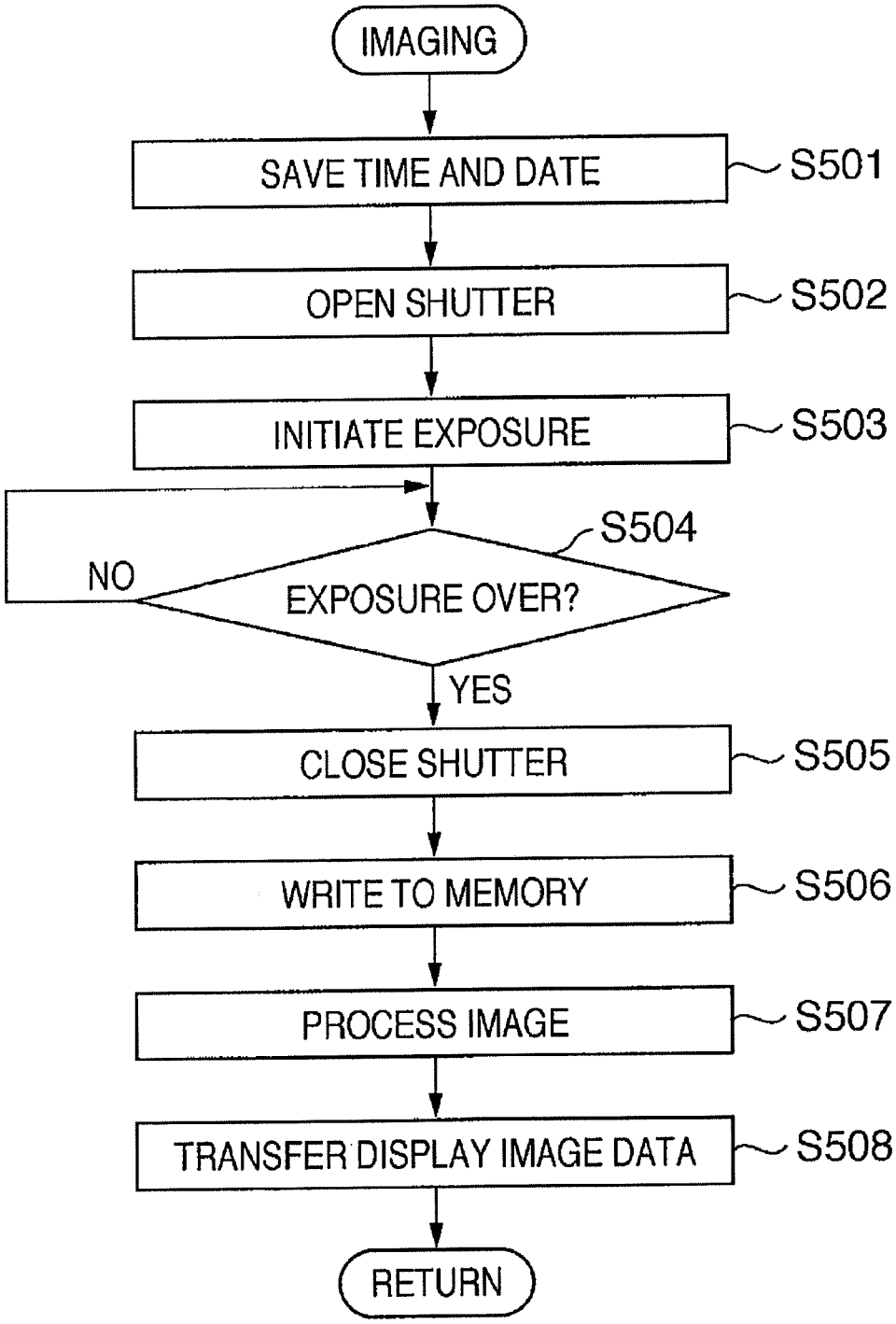
FIG. 5 is a flow chart illustrating an example of an imaging process performed by the digital camera 100 according to the first embodiment of the present invention.

FIG. 5 is a flow chart illustrating an example of the imaging process performed in S312 of FIG. 3.

In S501, at the start of imaging, the system control unit 50 acquires the time and date from, for instance, a built-in system timer (not shown) and stores them in the system memory 52. Subsequently, in S502, the shutter 12, which has a variable aperture feature, is opened in accordance with an aperture value based on the photometric data stored in the system memory 52. This initiates exposure (S503).

In S504, the system control unit 50 waits for the photometric data-based exposure time to elapse. In S505, when the final moment of the exposure time is reached, the system control unit 50 closes the shutter 12. Then, in S506, an electric charge signal is read from the image capture element 14 and image data is written to the memory 30 via the A/D converter 16 and memory control unit 22, or directly from the A/D converter 16. The steps S501~S506 correspond to the exposure process.

Subsequently, in S507, the system control unit 50 performs image processing on the image data written to the memory 30 using the image processing unit 20 and compression/decompression unit 32 as needed. The image processing includes, for instance, a white balance process performed by the image processing unit 20 and a compression process performed by the compression/decompression unit 32. Image data that has undergone image processing is written to the memory 30.

Then, in S508, the system control unit 50 reads the image data from the memory 30, decompresses it using the compression/decompression unit 32, and resizes it for display on the image display unit 28. Then, in order to display the resized image data on the image display unit 28, it is transferred to the D/A converter 26. When this series of processing steps is over, the imaging process terminates.

(Main Face Selection Process)

Figure 6:
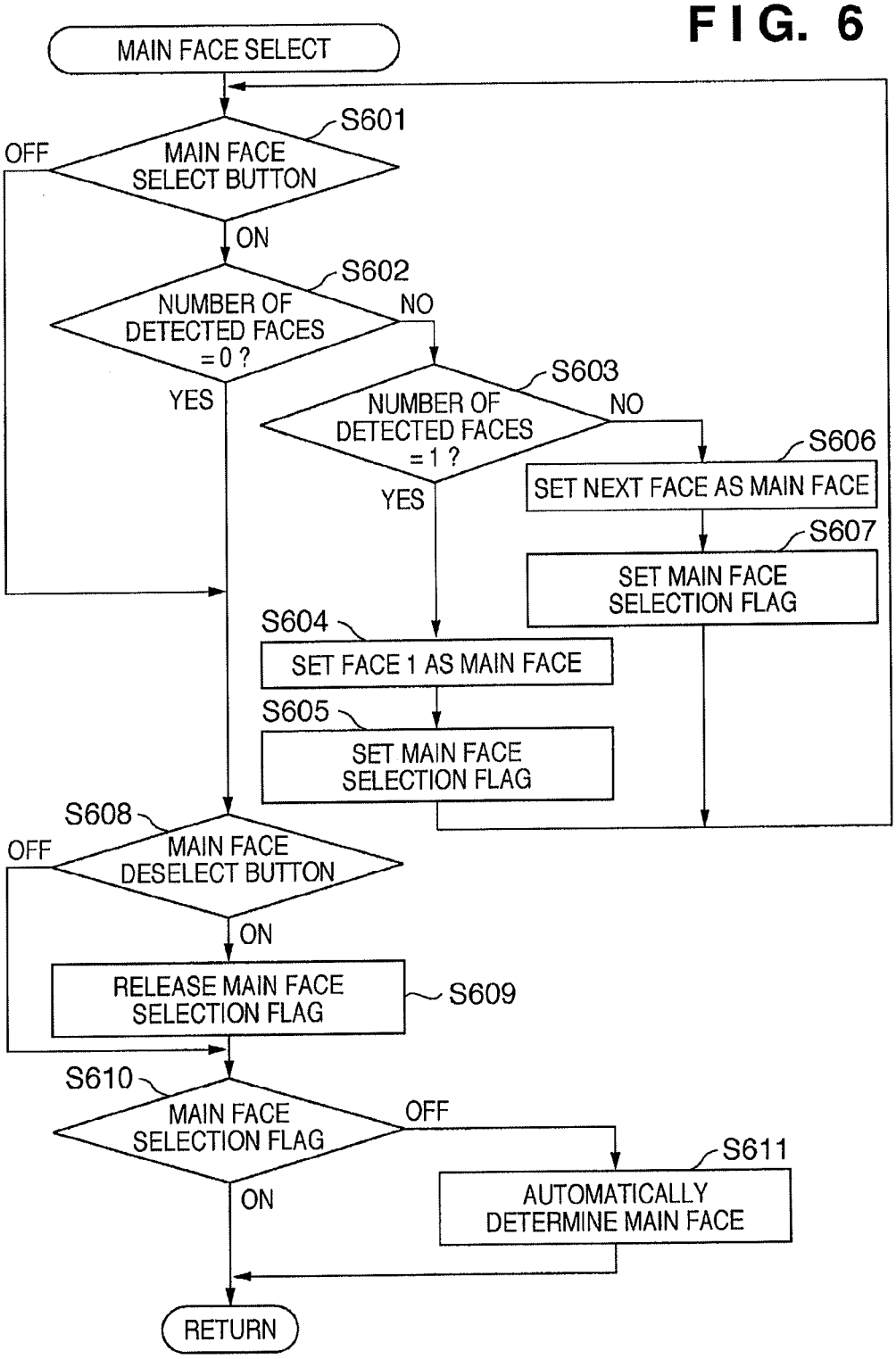
FIG. 6 is a flow chart illustrating an example of a main face selection process performed by the digital camera 100 according to the first embodiment of the present invention.

FIG. 6 is a flow chart illustrating an example of the main face selection process performed in S321 of FIG. 3. As explained above, the main face selection process is an example of a main subject selection process, and main subject selection may be performed by other methods.

The system control unit 50 determines whether the main face select button (not shown) included in the operator input unit 70 has been depressed (whether it is "on" or "off") (S601). Then, it advances the process to S602 if it is "on", and to S608 if it is "off".

In S602, the system control unit 50 checks the number of detected faces (subjects) in the face information stored in the system memory 52 and advances the process to S608 if no faces have been detected. Moreover, if faces have been detected, it advances the process to S603, where it is determined whether the number of detected faces is "1". Then, if the number of detected faces is "1", the system control unit 50 advances the process to S604, and if the number of detected faces is "2" or more, respectively advances the process to S606.

In S604, the system control unit 50 designates the only detected face as the main face (S604). The system control unit 50 then sets the main face selection flag stored in the system memory 52 etc. (S605) and directs the process back to S601.

If multiple faces (subjects) have been detected, in S603, the system control unit 50 designates one of the multiple faces as the main face (main subject). If there is a face that has already been selected as the main face, another one (the next one) besides the face currently selected as the main face is designated as the main face (S606). The main face selection flag stored in the system memory 52 etc. is then set (S607) and the process is directed back to S601. In other words, if multiple faces have been detected, the multiple faces are successively selected to be used as the main face while the main face select button is ON. Therefore, the user can select the desired face as the main face (main subject) by keeping the main face select button "on" until the desired face is selected as the main face.

If the main face select button is "off" or if the number of detected faces is "0" while the main face select button "on", the process advances to S608. In S608, the system control unit 50 determines whether the main face deselect button (not shown) included in the operator input unit 70 has been depressed (whether it is "on" or "off"). The process is then advanced to S609 if it is "on" and to S610 if it is "off".

If the main face deselect button is "on", in S608, the system control unit 50 releases the main face selection flag stored in the system memory 52 etc. (S609) and advances the process to S610.

In S610, the system control unit 50 checks the main face selection flag stored in the system memory 52, etc., and terminates the main face selection process of S321 if the flag has been set.

If the main face selection flag has not been set (S610), the system control unit 50 determines the main face based on the face information stored in the system memory 52 (S611) and terminates the main face selection process of S321. If the number of detected faces in S611 is, for example, "0", no main face selection is performed. Moreover, if the number of detected faces is "1", the detected face is automatically selected as the main face. Moreover, if there is a multiple number of detected faces, that is, if it is "2" or more, the face possessing the highest priority can be selected as the main face among the multiple faces by increasing the priority level if the position of the face is closer to the center of the screen and if its size is larger. Quite naturally, it goes without saying that the main face may be selected not only by considering the position and size, but also by considering the degree of reliability and other information.

(Focus Detection Process)

Figure 7:
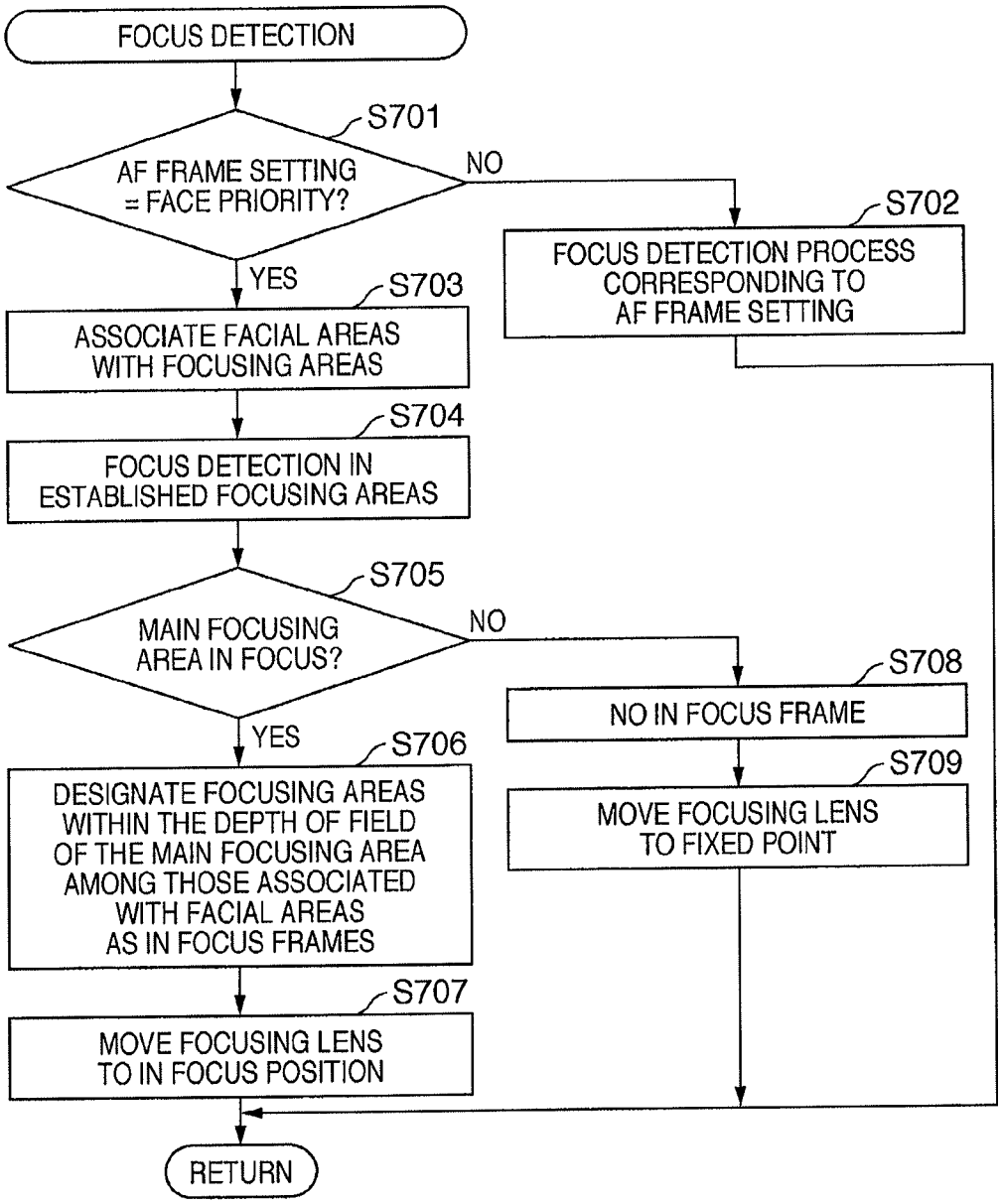
FIG. 7 is a flow chart illustrating an example of a focus detection process performed by the digital camera 100 according to the first embodiment of the present invention.

FIG. 7 is a flow chart illustrating an example of the focus detection process performed in S322 of FIG. 3.

The system control unit 50 determines whether the current AF frame setting is "Face Priority" (S701). Then, if the AF frame setting is a setting other than "Face Priority", it performs a focus detection process corresponding to the AF frame setting (S702) and terminates the focus detection process S322.

On the other hand, if the AF frame setting is "Face Priority", in S703, the system control unit 50 checks the face information stored in the system memory 52, which is an example of the subject information. Subsequently, it associates (configures) the focusing areas, including the coordinates of the centers of each facial area, with the detected faces (facial areas) (S703). It should be noted that the region corresponding to the facial area of the main face among the focusing areas that are set up is referred to as the "main focusing area".

Here, if a facial area is rectangular, the coordinates of its center may be, for instance, the coordinates of the point of intersection of its diagonals. Alternatively, the coordinates of the centroid may be used as the coordinates of the center. Furthermore, in the present Specification, a rectangular frame indicating a facial area is called a "face frame".

In S704, the system control unit 50 controls the focusing control unit 42 to carry out focus detection in the focusing areas set up in S703. Thus, a focus detection process is performed in the focusing areas corresponding to the facial areas. When the focus detection process ends, the system control unit 50 advances the process to S705.

In S705, the system control unit 50 checks whether the main focusing area, that is, the focusing area corresponding to the main face, is in focus. If it is determined to be in focus, the process is advanced to S706, and if it is determined to be out of focus, to S708.

In S706, the system control unit 50 designates focusing areas located within the depth of field in the focus detection results obtained for the main focusing area among the focusing areas associated with the facial areas in S703 as in focus frames and advances the process to S707. In S707, the system control unit 50 uses the focus detection results of the main focusing area as the in focus position and terminates the focus detection process by driving the focusing lens of the lens unit 10 to the in focus position with the help of the focusing control unit 42.

On the other hand, in S708, the system control unit 50 determines that there are no in focus frames and advances the process to S709. In S709, the system control unit 50 terminates the focus detection process by driving the focusing lens of the lens unit 10 to a predetermined fixed point with the help of the focusing control unit 42.

It should be noted that while the flow chart of FIG. 7 provides explanations on the assumption that the number of detected faces is "1" or greater in a situation, wherein the AF frame setting is "Face Priority", the number of detected faces may be checked between S701 and S703 and, if the number of detected faces is "0", it may be determined that there are no in focus frames and the process may be then directed to S708.

(In-Focus Indication)

Figure 8:
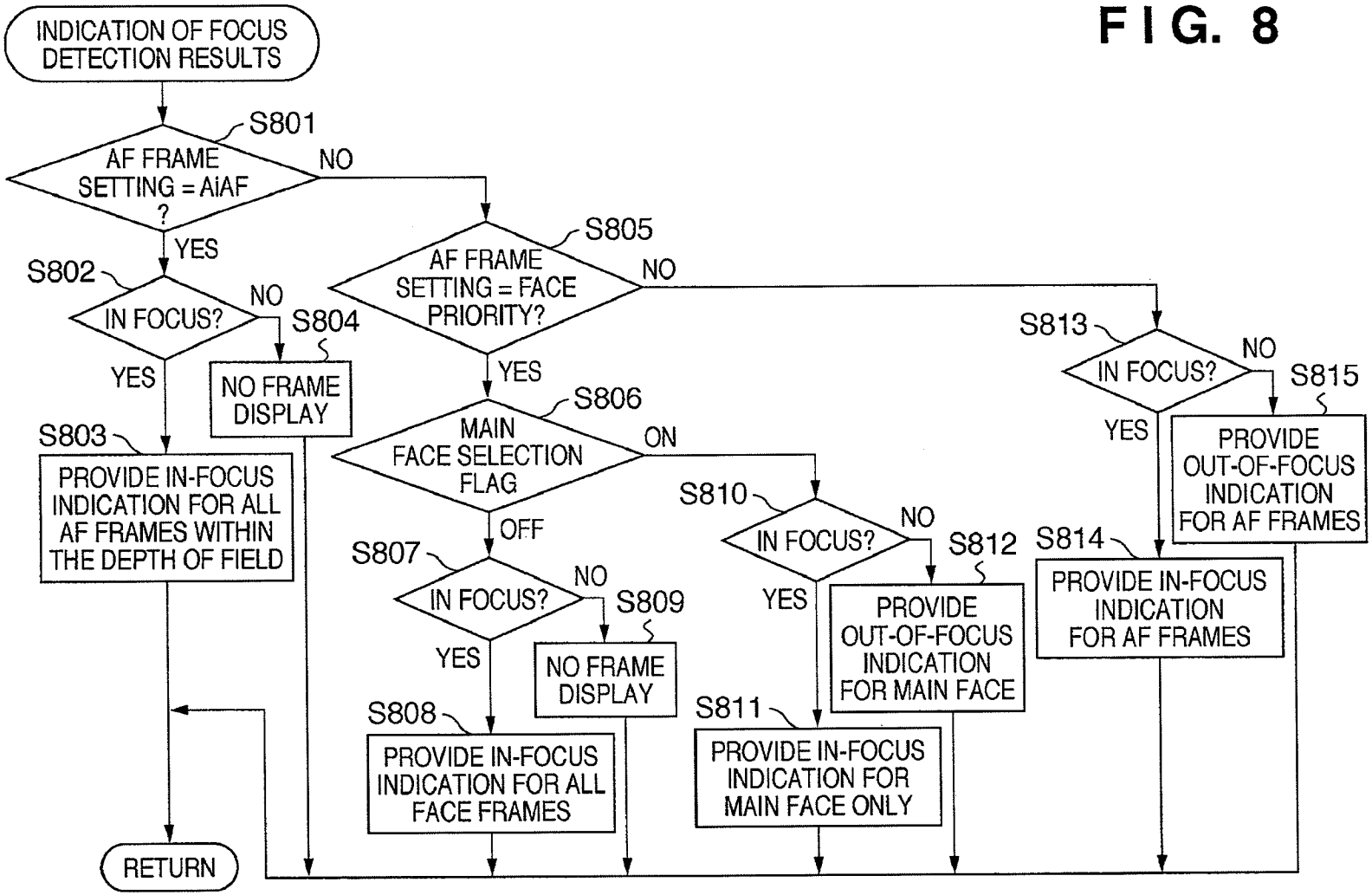
FIG. 8 is a flow chart illustrating an example of a focus detection result display process performed by the digital camera 100 according to the first embodiment of the present invention.

FIG. 8 is a flow chart illustrating an example of the display process performed in S323 of FIG. 3. As described above, in S323, indication is provided to show focus detection results (either "in focus" or "out of focus") for each focusing area.

First of all, in S801, the system control unit 50 checks the current AF frame setting and, if the AF frame setting is "AiAF", whereby a 9-frame AF area is set up and a focusing operation is performed therein, advances the process to S802.

In S802, the system control unit 50 checks the result of the focus detection process (S322 of FIG. 3 and FIG. 7) and, if the result is "in focus", advances the process to S803 and, if the result is "out of focus", to S804.

Figure 9A:
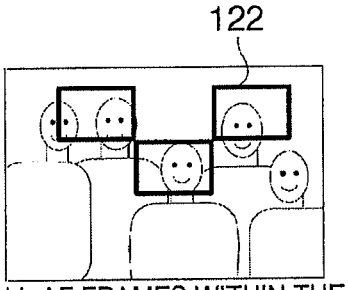
FIG. 9A through FIG. 9H are diagrams illustrating an example of in-focus indication provided by the digital camera 100 according to an embodiment of the present invention.

In S803, the system control unit 50 uses the image display unit 28 to provide in-focus indication for all the AF frames (focusing areas) within the depth of field. The in-focus indication can be performed, for instance, by displaying frames superimposed on the images of the live view display by writing the image data of the rectangular frames corresponding to the AF frames over the image data stored in the image display memory 24, etc. An example of the display of S803 is illustrated in FIG. 9A. In FIG. 9A, in-focus indication is provided (black frames are displayed) for three AF frames 122 within the depth of field.

Figure 9B:
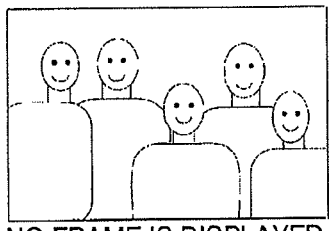

When the faces are out-of-focus, in S804, the system control unit 50 provides neither in-focus nor out-of-focus indication on the image display unit 28. An example of the display of S804 is illustrated in FIG. 9B.

If the AF frame setting in S801 is not "AiAF", in S805, the system control unit 50 determines whether the AF frame setting is "Face Priority". The system control unit 50 advances the process to S806 if the AF frame setting is "Face Priority" and advances it to S813 if it is not.

In S806, the system control unit 50 checks the main face selection flag stored in the system memory 52 and advances the process to S807 if the main face selection flag has not been set or to S810 if it has been set.

In S807, the system control unit 50 checks the result of the focus detection process (S322 of FIG. 3 and FIG. 7). If the result is "in focus" (the main focusing area is in focus), it advances the process to S808, and if the result is "out of focus", to S809.

Figure 9C:
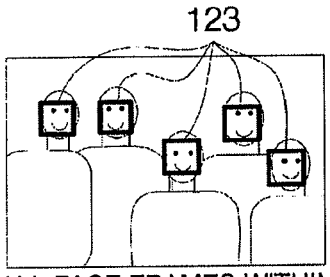

In S808, the system control unit 50 uses the image display unit 28 to provide in-focus indication for all the face frames corresponding to the focusing areas within the depth of field. An exemplary display is illustrated in FIG. 9C. In FIG. 9C, which shows an exemplary display obtained when AF frames corresponding to five human subjects are all within the depth of field, in-focus indication is provided (black frames are displayed) for the face frames 123 of the five human subjects.

In S809, in the same manner as in S804, the system control unit 50 provides neither in-focus nor out-of-focus indication on the image display unit 28. Accordingly, the exemplary display is as shown in FIG. 9B.

In S810, the system control unit 50 checks the result of the focus detection process (S322 of FIG. 3 and FIG. 7). If the result is "in focus" (the main focusing area is in focus), it advances the process to S811 and, if the result is "out of focus", to S812.

Figure 9D:
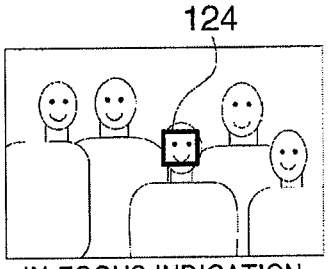

In S811, the system control unit 50 uses the image display unit 28 to provide in-focus indication for the face frame corresponding to the main focusing area, that is, only the facial area of the main face. An exemplary display is illustrated in FIG. 9D. Here, in-focus indication is provided in the face area 124 only for the main face, regardless of the in-focus status of the focusing areas other than the main focusing area, and no in-focus indication is provided (no face frames are displayed) for the facial areas other than the main face.

Figure 9E:
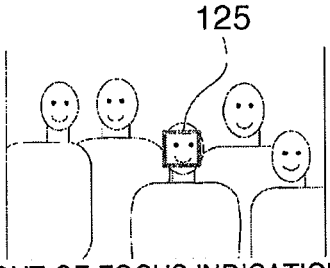
Figure 9F:
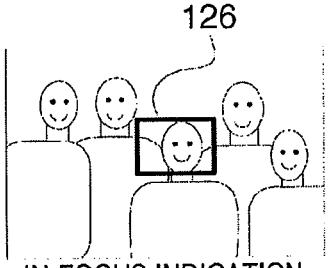
Figure 9G:
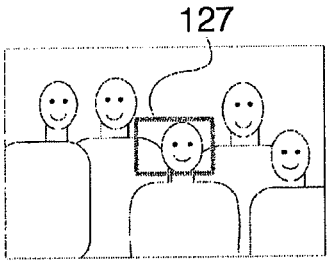
Figure 9H:
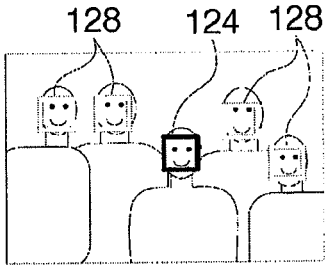

In this manner, if the main face selection flag has been set, that is, if the user himself or herself has designated the main face (main subject), in-focus indication is provided only for the main face (main subject), thereby allowing for ready identification of the user-selected main face. Even though the in-focus indication provided in S811 permits identification of the user-selected main face, it may also be provided for facial areas other than the main face, that is, subjects other than the main subject. For instance, as shown in FIG. 9H, the face frames 128 of other facial areas within the depth of field may be displayed in a form visually different from the face frame 124 associated with the main face. In the example illustrated in FIG. 9H, making the color of the face frame 124 associated with the main face different from that of the face frames 128 associated with the rest of the faces facilitates the identification of the main face. It goes without saying that, in addition to changing the color, various other methods can be used, such as causing only the face frame 124 of the main face to flash, or changing the thickness of the face frame 124, etc.

In S812, the system control unit 50 uses the image display unit 28 to provide in-focus indication for the face frame of the main face. An exemplary display is illustrated in FIG. 9E. Here, the indication provided for the face frame 125, which has a color different from that of the in-focus indication (FIG. 9D) of the main face in S811, is an out-of-focus indication (a gray frame is displayed).

If the AF frame setting determined in S805 is not "Face Priority", the process advances to S813 and the system control unit 50 checks the result of the focus detection process (S322 of FIG. 3 and FIG. 7).

If the result is "in focus" (S813), the system control unit 50 uses the image display unit 28 to provide in-focus indication for the AF frame (S814). Here, if the AF frame setting is "Center" or "Active", it is contemplated that there is a single AF frame. An exemplary display is illustrated in FIG. 9F. Here, in-focus indication is provided (a black frame is displayed) for the central AF frame 126.

If the result is "out-of-focus" (S813), the system control unit 50 uses the image display unit 28 to provide out-of-focus indication for the AF frame (S815). Here, if the AF frame setting is "Center" or "Active", it is contemplated that there is a single AF frame. An exemplary display is illustrated in FIG. 9G. An out-of-focus indication is provided (a gray frame is displayed) for the central AF frame 127.

As explained above, in accordance with the present embodiment, the in-focus indication associated with the main subject in an image capturing apparatus capable of designating a main subject in captured image is made visually different from the in-focus indication associated with the rest of the subjects (subjects other than the main subject) within the depth of field. For this reason, even if there are numerous subjects present within the depth of field, the in-focus status of the main subject can be readily determined.

In particular, providing such in-focus indication in situations wherein the user sets the main subject makes it easy to understand the in-focus status of the main subject intended by the user and ensures high usability.

Embodiment 2

Next, explanations will be provided regarding an image capturing apparatus used in a second embodiment of the present invention.

It should be noted that the image capturing apparatus according to this embodiment differs from the image capturing apparatus described in the first embodiment only in terms of the in-focus indication process (FIG. 3, S323 and FIG. 7), and explanations unrelated to the in-focus indication process are therefore omitted. The present embodiment is characterized by the fact that the user can configure settings related to in-focus indication and in-focus indication can be provided in accordance with the settings (in-focus indication settings). As far as the in-focus indication settings are concerned, the user can arbitrarily configure settings by manipulating a user input member used for in-focus indication settings included in the user input unit 70 or a menu screen (not shown) displayed on the image display unit 28 by pushing menu buttons included in the operator input unit 70. For instance, they can be set in the same manner as the AF frame settings in S305 (FIG. 3). In the same manner as with other setup values, the in-focus indication settings can be stored, for instance, in the nonvolatile memory 56.

Figure 11:
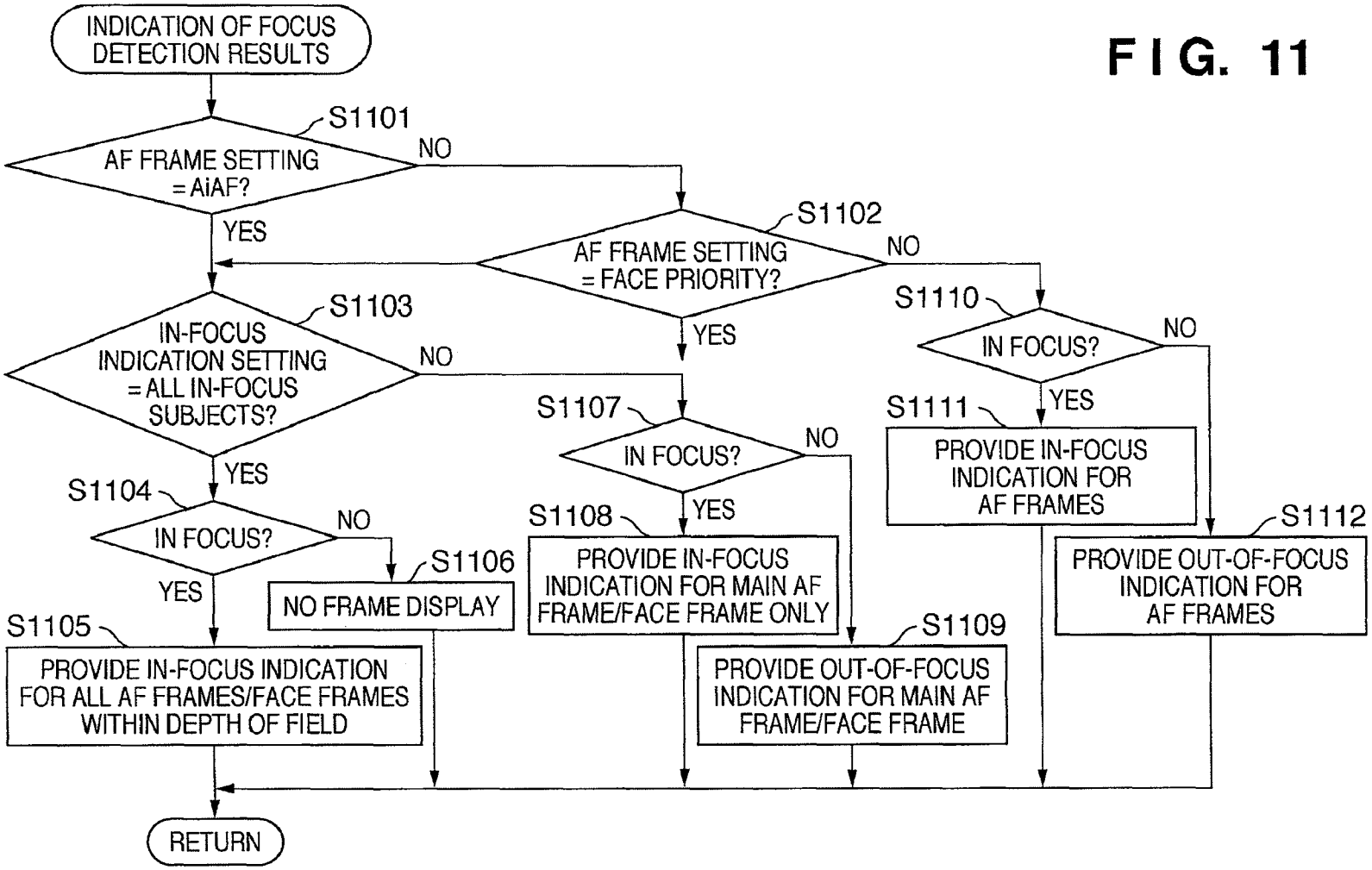
FIG. 11 is a flow chart illustrating an example of a focus detection result display performed by the digital camera 100 according to the second embodiment of the present invention.

FIG. 11 is a flow chart illustrating an example of a focus detection result display process performed by an image capturing apparatus according to a second embodiment of the present invention.

First of all, in S1101, the system control unit 50 checks the current AF frame setting and, if the AF frame setting is "AiAF", whereby a 9-frame AF area is set up and a focusing operation is performed therein, advances the process to S1103.

If the AF frame setting in S1101 is not "AiAF", in S1102, the system control unit 50 determines whether the AF frame setting is "Face Priority". The system control unit 50 then advances the process to S1103 if the AF frame setting is "Face Priority" and advances it to S1110 if it is not.

In S1103, the system control unit 50 checks the in-focus indication setting stored, for instance, in the nonvolatile memory 56 and determines whether the in-focus indication setting is "All In-focus Subjects". If the in-focus indication setting is "All In-focus Subjects", the system control unit 50 advances the process to S1104, and if not, to S1107.

In S1104, the system control unit 50 checks the result of the focus detection process (S322 of FIG. 3 and FIG. 7). If the result is "in focus" (any one the nine AF frames or the main focusing area is in focus), it advances the process to S1105 and, if it is "out of focus", to S1106.

In S1105, the system control unit 50 uses the image display unit 28 to provide in-focus indication for all the AF frames or face frames within the depth of field. Namely, depending on the AF frame setting, the in-focus indication provided will be as shown in FIG. 9A in case of "AiAF" and as shown in FIG. 9C in case of "Face Priority".

In S1106, the system control unit 50 provides neither in-focus nor out-of-focus indication on the image display unit 28 (FIG. 9B).

If the in-focus indication setting is "All In-focus Subjects", in S1107, the system control unit 50 checks the result of the focus detection process (S322 of FIG. 3 and FIG. 7). If the result is "in focus", it advances the process to S1108 and, if it is "out of focus", to S1109.

In S1108, the system control unit 50 uses the image display unit 28 to provide in-focus indication for the main focusing area (AF frame) or the face frame corresponding thereto, that is, the facial area of the main face. Namely, depending on the AF frame setting, the in-focus indication provided will be as shown in FIG. 9F in case of "AiAF" and as shown in FIG. 9D in case of "Face Priority".

In S1109, the system control unit 50 uses the image display unit 28 to provide out-of-focus indication for the main focusing area (AF frame) or the face frame corresponding thereto, that is, the facial area of the main face. Namely, depending on the AF frame setting, the in-focus indication provided will be as shown in FIG. 9G in case of "AiAF" and as shown in FIG. 9E in case of "Face Priority". As described above, the in-focus indication and out-of-focus indication may only differ in the color of the AF frame or face frame. In the present embodiment, in the same manner as in the first embodiment, in-focus indication is black (or white) and out-of-focus indication is gray.

If the AF frame setting determined in S1102 is "Face Priority", in S1110, the system control unit 50 checks the result of the focus detection process (S322 of FIG. 3 and FIG. 7). If the result is "in focus", it advances the process to S1111 and, if it is "out of focus", to S1112.

In S1111, the system control unit 50 uses the image display unit 28 to provide in-focus indication for the AF frame. Here, if the AF frame setting is "Center" or "Active", it is contemplated that there is a single AF frame. An exemplary display is illustrated in FIG. 9F. Here, in-focus indication is provided (a black frame is displayed) for the central AF frame.

In S1112, the system control unit 50 uses the image display unit 28 to provide out-of-focus indication for the AF frame. Here, if the AF frame setting is "Center" or "Active", it is contemplated that there is a single AF frame. An exemplary display is illustrated in FIG. 9G. An out-of-focus indication is provided (a gray frame is displayed) for the central AF frame.

In the first embodiment, the method of in-focus indication in the focusing area corresponding to the main face was selected depending on whether the user set the main face or not (whether the main face selection flag was set or not). By contrast, in the present embodiment, the method of in-focus indication in the focusing area corresponding to the main face is selected depending on whether the in-focus indication setting is "All In-focus Subjects".

It should be noted that, in the above-described embodiments, focusing areas were set up that corresponded to the position of the faces detected on the captured image screen and, when they were in focus, in-focus indication was provided for the focusing areas corresponding to the faces. However, specific subjects may be detected based on detecting other images. For instance, it is contemplated to perform detection by cutting out subject images from the background. In addition, positions on the captured image screen may be determined by entering positions on the captured image screen via an external input device or by detecting the line of sight of a user looking through the viewfinder, etc.

Moreover, in the above-described embodiment, special-purpose buttons included the main face select button and main face deselect button. However, the main face select/deselect operation may be addressed without providing special-purpose buttons, such as, for instance, with the help of up and down buttons or by means of long pressing of buttons used when setting up AF frames. Moreover, a main face select button may be provided and the main face deselect operation may be implemented using long pressing of the main face select button.

The present embodiment makes it possible to display the in-focus status of the main subject in a readily identifiable manner in accordance with the intentions of the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-210299, filed on Aug. 10, 2007, which is hereby incorporated by reference herein its entirety.

What is claimed is:

1. An image capturing apparatus comprising:

a detecting unit adapted to detect subjects in a captured image;

a selecting unit adapted to select a main subject from among the subjects detected by the detecting unit;

a setting unit adapted to set up focusing areas corresponding to the subjects detected by the detecting unit;

a focusing control unit adapted to perform focus detection in the focusing areas set up by the setting unit; and a display control unit displaying, when the main subject becomes in focus, in-focus indications for the subjects within a predetermined depth of field such that the in-focus indication for the main subject is in different display form from a display form for the remaining subjects *regardless of the result of the focus detection for the focus area corresponding to the main subject and the result of the focus detection for the focusing area corresponding to the subject other than the main subject and within the depth of field* if the main subject is selected based on a user's instruction, and otherwise, the in-focus indications for the subjects within the predetermined depth of field, including the main subject, in the same display form.

2. The image capturing apparatus according to claim 1, wherein the selecting unit selects the main subject based on either the user's instruction or subject information obtained by the detecting unit for each subject, and wherein, if the main subject is selected based on the user's instruction, the display control unit displays as the in-focus indications, frame image(s) represent(s) the focusing area(s) corresponding to the main subject and frame image(s) represent(s) the focusing area(s) corresponding to the subject(s) other than the main subject and within the predetermined depth-of-field are different in at least one of a color, a thickness, and a flashing speed, and wherein, if the main subject is selected based on the subject information, the display control unit displays as the in-focus indication, frame images represent(s) the focusing area(s) corresponding to the main subject and frame image(s) represent(s) the focusing area(s) corresponding to the subject(s) other than the main subject and within the depth-of-field are in the same display form.

3. The image capturing apparatus according to claim 1, wherein each of the frame images represents either the corresponding focus detection area or an area of the subject.

4. The image capturing apparatus according to claim 1, wherein the detecting unit detects human faces as the subjects.

5. An image capturing apparatus comprising:

a detecting unit adapted to detect subjects in a captured image;

a selecting unit adapted to select a main subject from among the subjects detected by the detecting unit;

a setting unit adapted to set up focusing areas corresponding to the subjects detected by the detecting unit;

a focusing control unit adapted to perform focus detection in the focusing areas set up by the setting unit; and a display control unit adapted to display indications representing (i) the result(s) of the focus detection performed by the focusing control unit for the focusing area(s) corresponding to the main subject and (ii) the result(s) of the focus detection performed by the focusing control unit for the focusing area(s) corresponding to subject(s) other than the main subject and within a depth-of-field, wherein in a case where the selecting unit selects the main subject based on a user's instruction, the display control unit only displays the indications representing the result(s) of the focus detection performed by the focusing control unit for the focusing area(s) corresponding to the main subject, and wherein, in a case where the selecting unit selects the main subject based on subject information obtained by the detecting unit for each subject, the display control unit displays indications representing (i) the result(s) of the focus detection performed by the focusing control unit for the focusing area(s) corresponding to the main subject and (ii) the result(s) of the focus detection performed by the focusing control unit for the focusing area(s) corresponding to subject(s) other than the main subject and within a depth-of-field.

6. The image capturing apparatus according to claim 5 wherein:

the display control unit determines, based on a configuration, whether to display the result(s) of the focus detection performed by the focusing control unit for the focusing area(s) corresponding to subject(s) other than the main subject and within a depth-of-field or not.

7. The image capturing apparatus according to claim 5, wherein the detecting unit detects human faces as the subjects.

8. A control method for an image capturing apparatus comprising:

detecting step of detecting subjects in a captured image;

selecting step of selecting a main subject from among the subjects detected in the detection step;

setting step of setting up focusing areas corresponding to the subjects detected in the detection step;

focusing control step of performing focus detection in the focusing areas set up in the setting step; and display control step of displaying, when the main subject becomes in focus, in-focus indications for the subjects within a predetermined depth of field such that the in-focus indication for the main subject is in different display form from a display form for the remaining subjects *regardless of the result of the focus detection for the focus area corresponding to the main subject and the result of the focus detection for the focusing area corresponding to the subject other than the main subject and within the depth of field* if the main subject is selected based on a user's instruction, and otherwise the in-focus indications for the subjects within the predetermined depth of field, including the main subject, in the same display form.

9. A control method for an image capturing apparatus comprising:

detecting step of detecting subjects in a captured image;

selecting step of selecting a main subject from among the subjects detected in the detecting step;

setting step of setting up focusing areas corresponding to the subjects detected in the detecting step;

focusing control step of performing focus detection in the focusing areas set up in the setting step; and display control step of displaying indications representing (i) the result(s) of the focus detection performed in the focusing control step for the focusing area(s) corresponding to the main subject and (ii) the result(s) of the focus detection performed in the focusing control step for the focusing area(s) corresponding to subject(s) other than the main subject and within a depth-of-field, wherein in a case where the selecting step selects the main subject based on a user's instruction, the display control step only displays the indications representing the result(s) of the focus detection performed in the focusing control step for the focusing area(s) corresponding to the main subject, wherein, in a case where the selecting unit selects the main subject based on subject information obtained by the detecting unit for each subject, the display control unit displays indications representing (i) the result(s) of the focus detection performed by the focusing control unit for the focusing area(s) corresponding to the main subject and (ii) the result(s) of the focus detection performed by the focusing control unit for the focusing area(s) corresponding to subject(s) other than the main subject and within a depth-of-field.

*10. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focusing control unit adapted to perform focus detection in the focusing areas set up by the setting unit; and*

*a display control unit displaying, when the main subject becomes in focus, in-focus indications for the subjects within a predetermined depth of field such that the in-focus indication for the main subject is in different display form from a display form for the remaining subjects regardless of the result of the focus detection for the focus area corresponding to the main subject and the result of the focus detection for the focusing area corresponding to the subject other than the main subject and within the depth of field if the main subject is selected based on a user's instruction.*

*11. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying results of the focus detection performed by the focus detecting unit,*

*wherein the display control unit displays both a result of the focus detection for a focusing area corresponding to the main subject and one or more results of the focus detection for one or more focusing areas corresponding to one or more subjects other than the main subject and within a depth of field, and*

*wherein the display control unit displays the result of the focus detection for the focusing area corresponding to the main subject and the one or more results of the focus detection for the one or more focusing areas corresponding to the one or more subjects other than the main subject and within the depth of field in different display forms, regardless of the result of the focus detection for the focus area corresponding to the main subject and the result of the focus detection for the focusing area corresponding to the subject other than the main subject and within the depth of field.*

*12. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying results of the focus detection performed by the focus detecting unit,*

*wherein the display control unit displays both a result of the focus detection for a focusing area corresponding to the main subject and one or more results of the focus detection for one or more focusing areas corresponding to one or more subjects other than the main subject and within a depth of field, and*

*wherein the display control unit displays the result of the focus detection for the focusing area corresponding to the main subject and the one or more results of the focus detection for the one or more focusing areas corresponding to the one or more subjects other than the main subject and within the depth of field in different display forms, regardless of the result of the focus detection for the focus area corresponding to the main subject and the result of the focus detection for the focusing area corresponding to the subject other than the main subject and within the depth of field if the main subject is selected based on a user's instruction.*

*13. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying a result of the focus detection performed by the focus detecting unit,*

*wherein the selecting unit selects the main subject based on either a user's instruction or subject information obtained by the detecting unit for each subject, and*

*wherein the display control unit displays a result of the focus detection corresponding to the main subject that is selected based on the user's instruction and a result of the focus detection corresponding to the main subject that is selected based on the subject information in different display forms, and*

*wherein the display control unit displays both (i) a result of the focus detection for a focusing area corresponding to the main subject and (ii) one or more results of the focus detection for one or more focusing areas corresponding to one or more subjects other than the main subject and within a depth of field, and*

*wherein the display control unit displays both (i) the result of the focus detection for the focusing area corresponding to the main subject and (ii) the one or more results of the focus detection for the one or more focusing areas corresponding to the one or more subjects other than the main subject and within the depth of field in different display forms regardless of the result of the focus detection for the focus area corresponding to the main subject and the result of the focus detection for the focusing area corresponding to the subject other than the main subject and within the depth of field.*

*14. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying a result of the focus detection performed by the focus detecting unit,*

*wherein the selecting unit selects the main subject based on either a user's instruction or subject information obtained by the detecting unit for each subject, and*

*wherein the display control unit displays a result of the focus detection corresponding to the main subject that is selected based on the user's instruction and a result of the focus detection corresponding to the main subject that is selected based on the subject information in different display forms, and*

*wherein the display control unit displays both (i) a result of the focus detection for a focusing area corresponding to the main subject and (ii) one or more results of the focus detection for one or more focusing areas corresponding to one or more subjects other than the main subject and within a depth of field,*

*wherein the display control unit displays both (i) the result of the focus detection for the focusing area corresponding to the main subject and (ii) the one or more results of the focus detection for the one or more focusing areas corresponding to the one or more subjects other than the main subject and within the depth of field in different display forms regardless of the result of the focus detection for the focus area corresponding to the main subject and the result of the focus detection for the focusing area corresponding to the subject other than the main subject and within the depth of field if the main subject is selected based on the user's instruction.*

*15. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying results of the focus detection performed by the focus detecting unit,*

*wherein the selecting unit selects the main subject based on either a user's instruction or subject information obtained by the detecting unit for each subject, and*

*wherein the display control unit displays a result of the focus detection corresponding to the main subject that is selected based on the user's instruction and a result of the focus detection corresponding to the main subject that is selected based on the subject information in different display forms, and*

*wherein the display control unit displays (i) a result of the focus detection for a focusing area corresponding to the main subject and does not display (ii) one or more results of the focus detection for one or more focusing areas corresponding to one or more subjects other than the main subject and within a depth of field.*

*16. An image capturing apparatus comprising:*

*a detecting unit adapted to detect subjects in a captured image;*

*a selecting unit adapted to select a main subject from among the subjects detected by the detecting unit;*

*a setting unit adapted to set up focusing areas corresponding to the subjects detected by the detecting unit;*

*a focus detecting unit adapted to perform focus detection in the focusing areas set up by the setting unit; and*

*a display control unit displaying results of the focus detection performed by the focus detecting unit,*

*wherein the selecting unit selects the main subject based on either a user's instruction or subject information obtained by the detecting unit for each subject, and*

*wherein the display control unit displays a result of the focus detection corresponding to the main subject that is selected based on the user's instruction and a result of the focus detection corresponding to the main subject that is selected based on the subject information in different display forms, and*

*wherein the display control unit displays (i) a result of the focus detection for a focusing area corresponding to the main subject and does not display (ii) one or more results of the focus detection for one or more focusing areas corresponding to one or more subjects other than the main subject and within a depth of field if the main subject is selected based on the user's instruction.*

* * * * *